United States Patent
Pauliukonis

[15] 3,672,396
[45] June 27, 1972

[54] METERING VALVE

[72] Inventor: Richard S. Pauliukonis, 6660 Greenbriar Drive, Cleveland, Ohio 44130

[22] Filed: Dec. 2, 1970

[21] Appl. No.: 94,276

[52] U.S. Cl.....................137/512, 137/613, 137/539
[51] Int. Cl..............................................F16k 15/18
[58] Field of Search..............137/512, 613, DIG. 4, 539, 137/512.5; 184/7 D

[56] References Cited

UNITED STATES PATENTS

| | | | |
|---|---|---|---|
| 3,561,475 | 2/1971 | Rockwell | 137/539 |
| 2,903,014 | 9/1959 | Sheppard | 137/512 |
| 3,049,832 | 8/1962 | Joffe | 137/512 |
| 3,081,730 | 3/1963 | Dvorachek | 137/512 |
| 2,103,822 | 12/1937 | Perry | 137/DIG. 4 |

*Primary Examiner*—M. Cary Nelson
*Assistant Examiner*—William H. Wright

[57] ABSTRACT

A valve for transmitting minute amounts of lubricant flow, be it grease or oil or other viscous fluid, from supply to receiver means, such as a bearing in a machine, having a short piece of elastomer tubing and a ball conveniently placed inside the valve body to perform the dual function of directional checking and volume metering without the use of springs.

7 Claims, 1 Drawing Figure

PATENTED JUN 27 1972 3,672,396
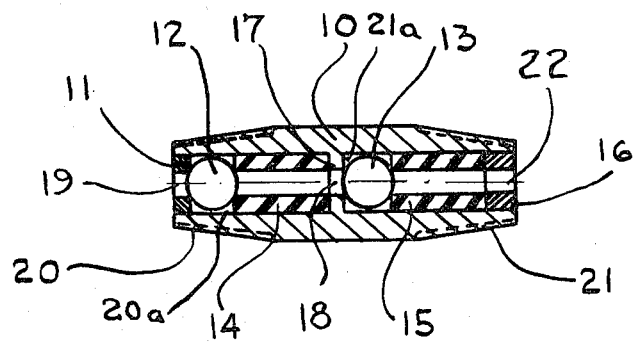
INVENTOR.
RICHARD S. PAULIUKONIS

METERING VALVE

The present invention provides a valve for lubricating machine bearings or gears in a continuous fashion by transmitting a pressurized flow of lubricant or other fluid from a supply to a receiver means in minute flows upon the application of such pressure to the interior of such valve, such interior being of simplest design to receive only a limited amount of such pressurized fluid for storage within its proper and for further transmittance upon subsequent application of fluid pressure equivalent to a pulse, such pulse being of a very limited time element, and subsequently to check fluid return by additional means provided therein in order to insure directional flow and positive lubricant supply to a bearing or gear in a machine.

Present metering valves are designed to operate with rather complicated valve components in terms of machined plugs of precise dimension with seals and springs attached thereto by rather costly techniques.

It is obviously desirable to provide valves of this general type which are very simple in design, and particularly inexpensive to produce.

The present invention provides valves of this type which are reliable, extremely simple, and suitable for production from any material of construction be it plastic molded or machined from stock at low cost, in particular that according to tests they do not require precise dimensional control for operational reliability.

These and other objects and advantages of the invention will become more fully apparent from the ensuing description on an embodiment of the invention taken together with the accompanying drawings.

In the drawings,

FIG. 1 is a cross sectional view of a valve embodying the invention.

In FIG. 1, a valve body 10 having an infeed end 20 and a receiver end 21 threaded for an easy installation into a fluid supply circuit is provided with a set of directional flow controls assembled therein.

At the infeed end, port 19 provided with a check ball 12 is connected to a fluid supply system for entrance of pressurized lubricant. The valve receiver end having exit port 22 for lubricant exhaust is connected to a machine with gears or bearings subject to constant lubrication.

Valve housing 10 of round, rectangular, hexagonal or other configuration with longitudinal dimension preferably of at least twice that of the body thickness is provided with a central bore substantially divided into two compartments by a divider 17, and connected with a small hole 18 provided therein. The larger compartmental bores at these ends comprise an infeed bore 20a in communication with a receiver bore 21a via central hole 18. Bores 20a and 21a are dimensioned to be in length at least twice their diameters.

Inside said bores identical pieces of elastomer tubing 14 and 15 are located within each compartment with balls 12 and 13 terminating each entrance elastomer tubing end at points 19 and 18 respectively of FIG. 1, and assembled together to act as a directional check valve for control of fluid flow from the valve infeed end to the receiver end in a permanent assembly. End plug 11 with port 19 and end plug 16 with port 22 cover bores 20a and 21a respectively and insure the necessary check valve preloading during initial assembly of metering valve of the invention.

The invention is not restricted to the slavish imitation of each and nearly every one of the details described above which has been set forth merely by way of example with the intent of most clearly setting forth the teaching of the invention. Obviously, devices may be provided which change, eliminate, or add certain specific structural or procedural details without departing from the invention.

WHAT IS CLAIMED IS:

1. A valve for transmitting a pressurized flow of lubricant from a supply to a receiver means in minute flows upon application of fluid pressure to the interior of such valve having a valve housing of longitudinal dimension preferably of at least twice that of the thickness dimension with threaded infeed end for connection to the fluid supply source and receiver end threaded for an easy installation to the machine provided with gears or bearings subject to constant lubrication, and a port leading to the interior of said housing at the infeed end including a port leaving interior of said housing at the receiver end, said ports comprising identical valve compartments of diameters identical to each other divided by a central divider along the central portion of said housing, said divider provided with a small hole for fluid communication between the infeed and the receiver compartments upon pressure pulse of fluid supplied from the source to the receiver, said compartments provided with identical pieces of elastomer tubing in both diameter and length and assembled with a check ball terminating each at the tubing entrance end and the fluid entrance port for control of directional fluid flow when pressure pulse increases tending to squeeze the elastomer tubing and to permit small amounts of fluid supply to the infeed compartment first and subsequently upon repeated pressure pulse to transit to the second compartment via second check ball elastically moving away from its seat and permitting directional fluid flow in minute amounts toward the receiver end, and blocking the return flow by ball seating against the divider hole and thereby separating the receiver end fluid quantity from the quantity trapped at the infeed end in the compartment controlled by the first ball seating against the infeed hole of the end plug of the infeed compartment, said elastomer tubing within said valve body together with balls permanently assembled with the use of end plugs comprising a metering valve without the use of springs.

2. A metering valve as in the foregoing claim wherein the valve body having equal diameter bores at each end of the length larger than the diameter and separated by a divider provided with smaller diameter hole in the center receives slideably in each bore an elastomer tubing and a ball of the outside diameter of the size nearly the same as the size of the bore.

3. A metering valve as in claim 1 including the ball and the tubing inside each compartment of the valve body wherein the open bore end is adapted to be closed by a closure, said closure representing an end plug with a central opening for fluid supply at the infeed end and for fluid exhaust at the receiver end.

4. A metering valve as in the claim 1 wherein valve body having an infeed end compartment and a receiver end compartment of unequal diameters at each body end, separated by a divider provided with smaller diameter hole in the center, receives slideably in each bore an elastomer tubing and a ball of the outside diameters of the size nearly the same as the size of each bore.

5. A metering valve as in the claim 1, wherein the valve body having an infeed end and a receiver end including directional flow controls inside said valve body permanently assembled for control of fluid flow from the source to the receiver is provided with flanges at the receiver end for valve attachement to a machine subject to lubrication and at the infeed end of said valve body for valve attachment to a circuit supplying the fluid for lubrication.

6. A metering valve as in claim 1, wherein the valve body having an infeed end compartment provided with an elastomer tubing and a ball permanently secured within infeed end compartment by a plug is provided with a check valve other than the elastomer tubing and a ball design in the second compartment of the valve body comprising the receiver end of the metering valve.

7. A metering Valve as in claim 1 wherein the valve body and the end plugs are molded from plastic material.

* * * * *